Figure 1A:
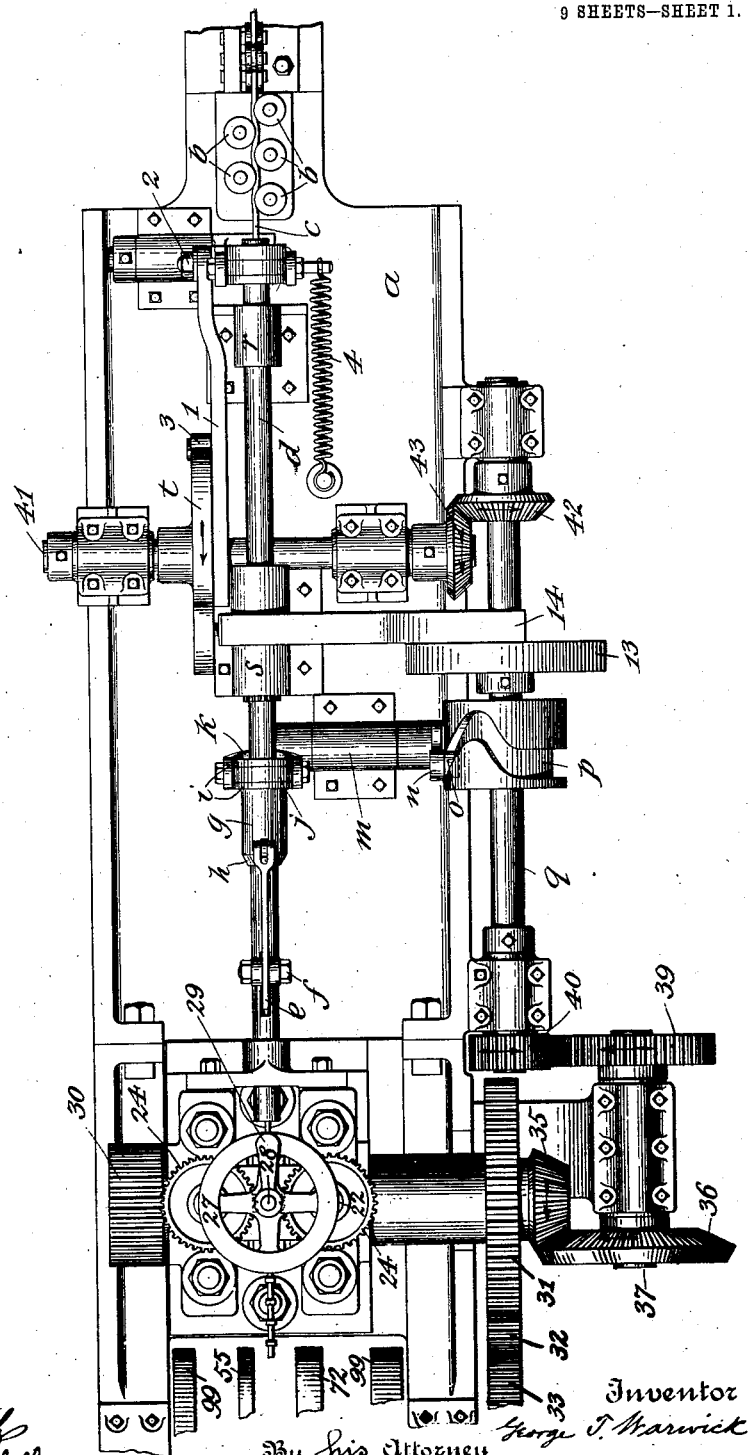

No. 842,282. PATENTED JAN. 29, 1907.
G. T. WARWICK.
SCREW MACHINE.
APPLICATION FILED JULY 16, 1901.

9 SHEETS—SHEET 1.

Witnesses
Chas. T. Schwed
M. A. Campbell

Inventor
George T. Warwick
By his Attorney
Wm. F. Bellows

No. 842,282.
PATENTED JAN. 29, 1907.
G. T. WARWICK.
SCREW MACHINE.
APPLICATION FILED JULY 16, 1901.
9 SHEETS—SHEET 2.
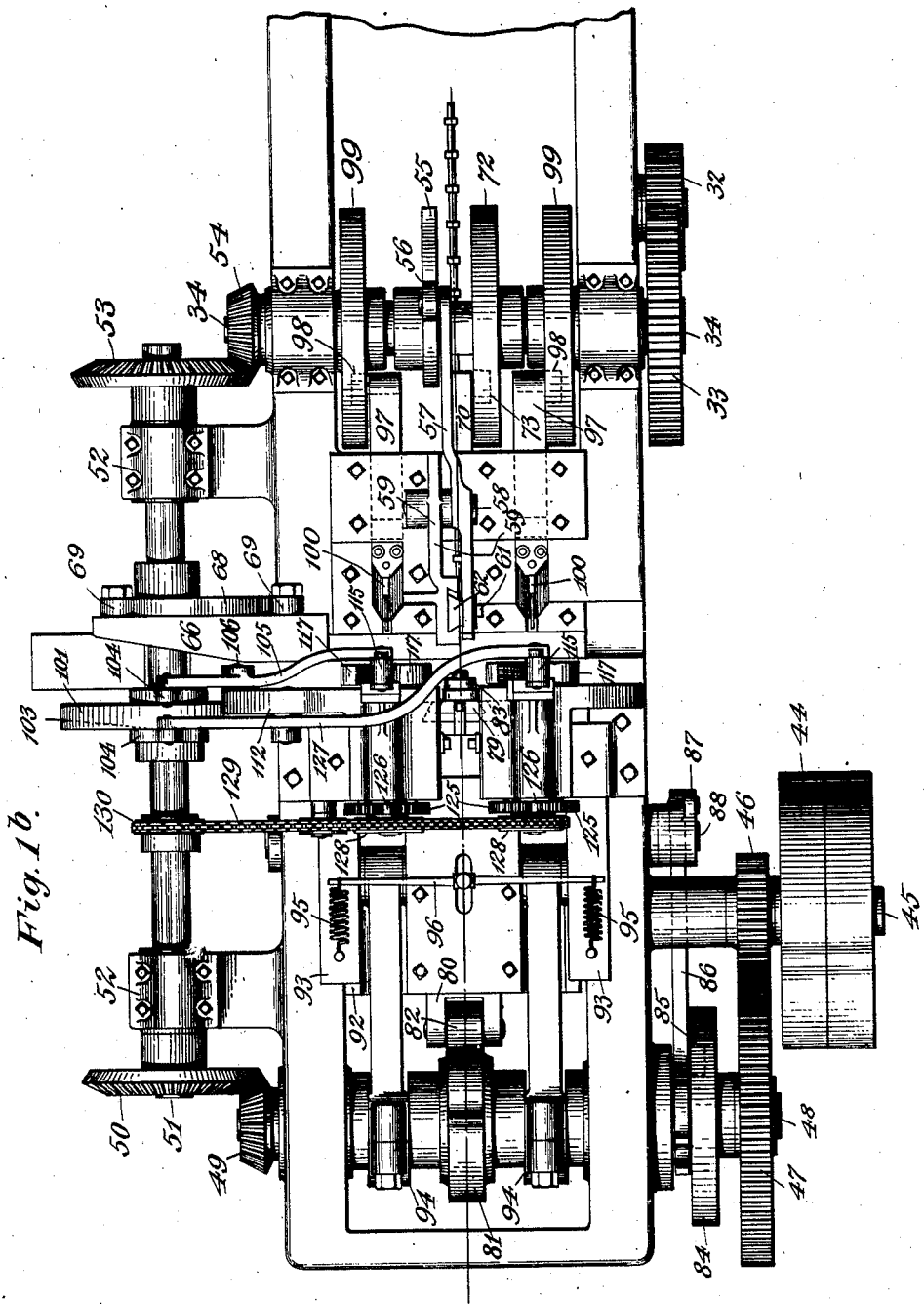

No. 842,282. PATENTED JAN. 29, 1907.
G. T. WARWICK.
SCREW MACHINE.
APPLICATION FILED JULY 16, 1901.
9 SHEETS—SHEET 3.

Witnesses
Inventor
George T. Warwick,
By his Attorney

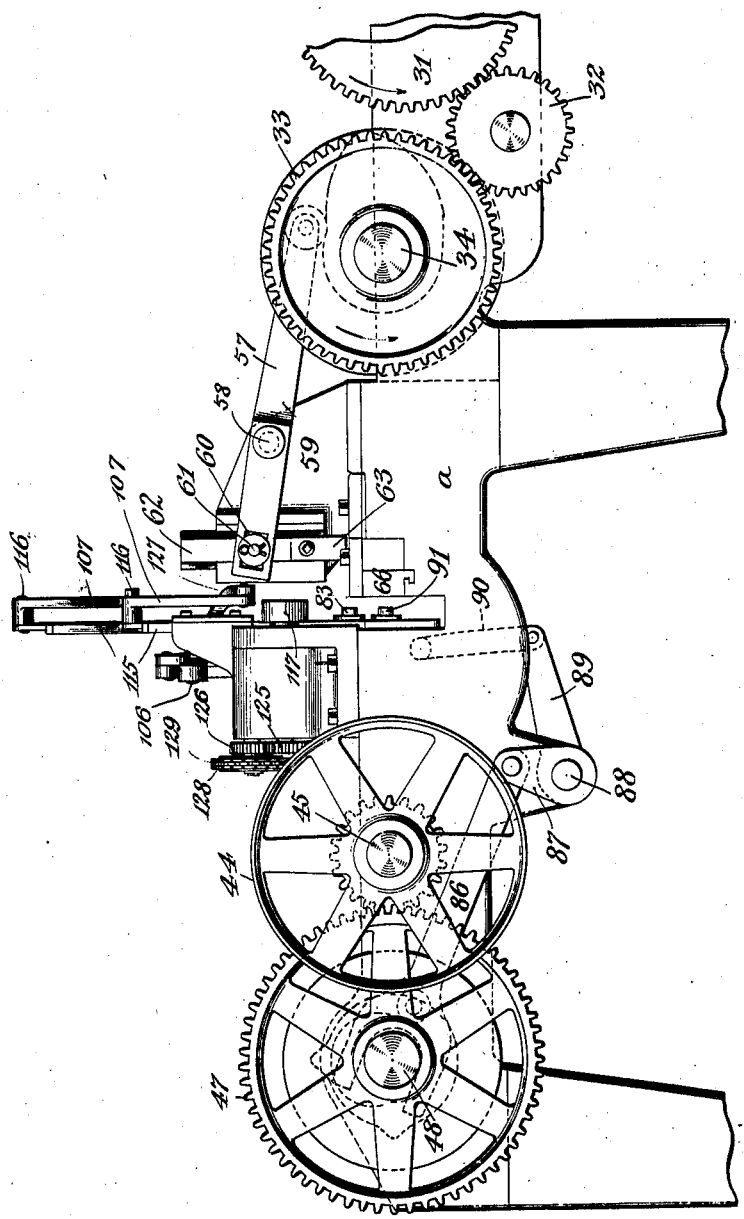

No. 842,282. PATENTED JAN. 29, 1907.
G. T. WARWICK.
SCREW MACHINE.
APPLICATION FILED JULY 16, 1901.
9 SHEETS—SHEET 5.
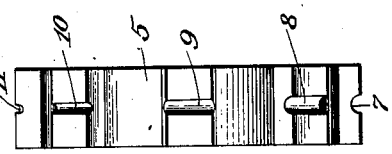
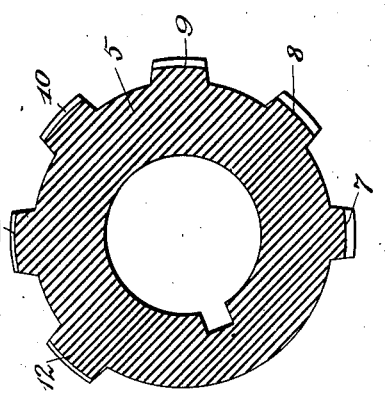
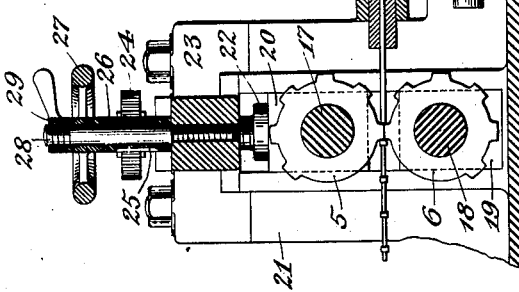
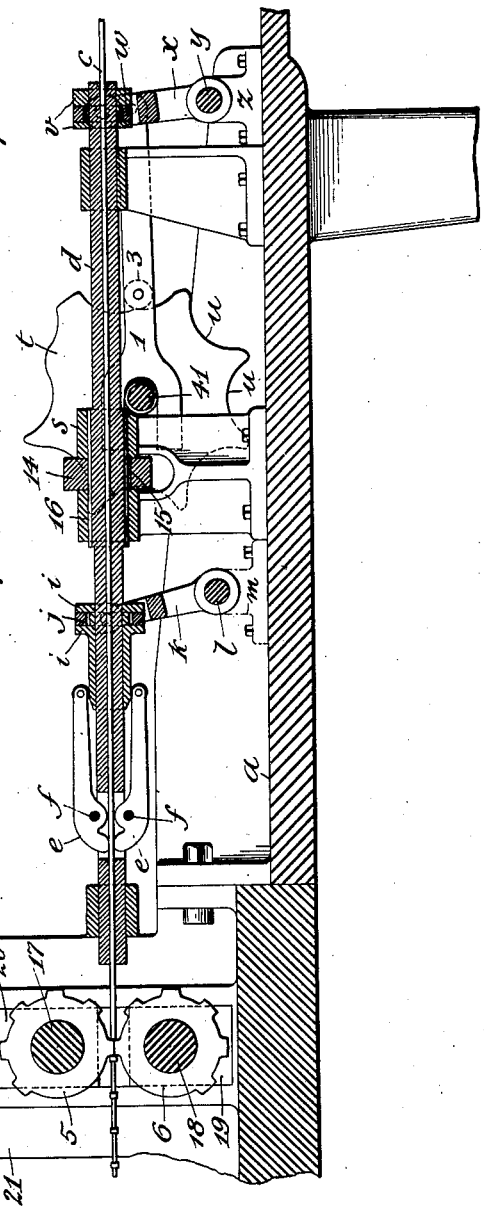

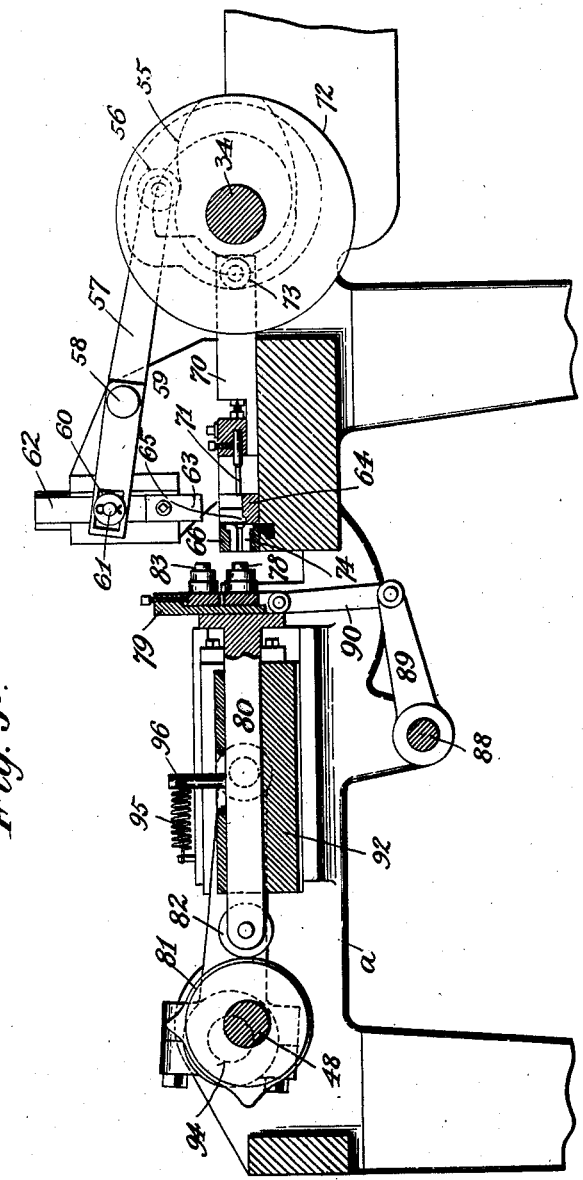

No. 842,282. PATENTED JAN. 29, 1907.
G. T. WARWICK.
SCREW MACHINE.
APPLICATION FILED JULY 16, 1901.
9 SHEETS—SHEET 7.
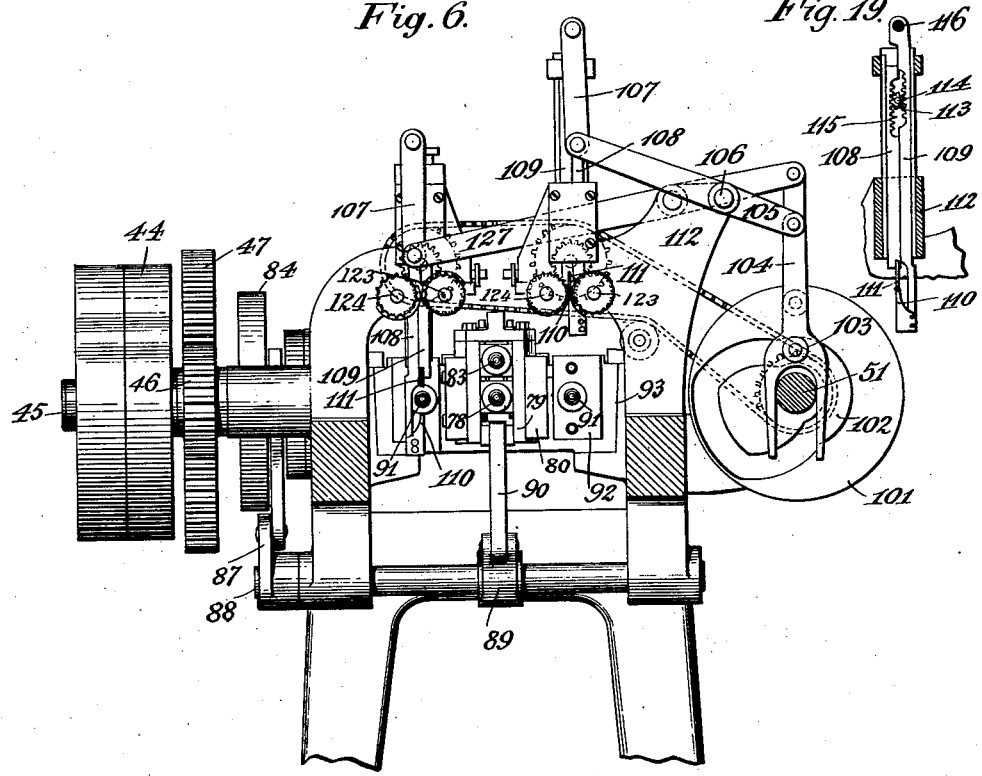
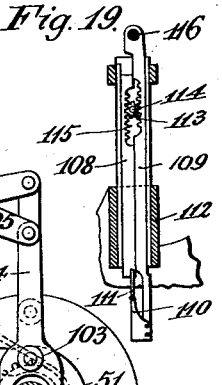
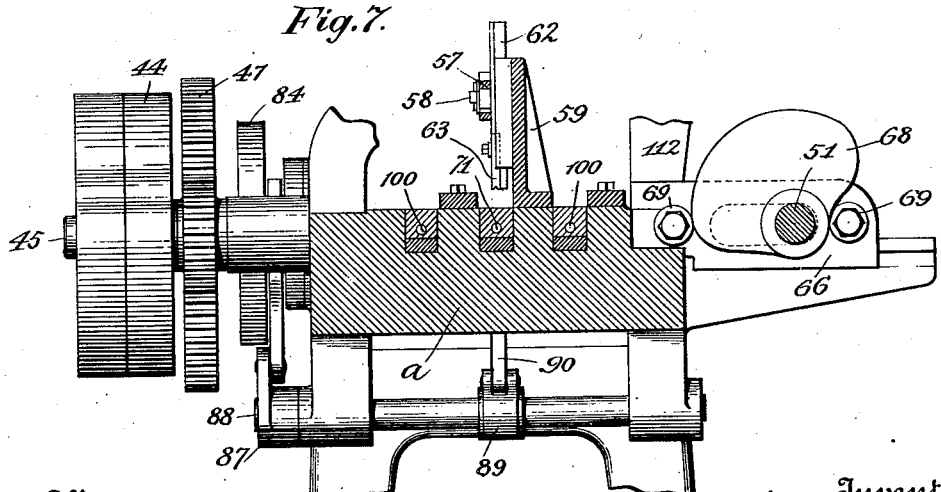
Witnesses
Chas. P. Schmelz
M. A. Campbell
Inventor
George T. Warwick,
By his Attorney
Wm. F. Bellows.

No. 842,282. PATENTED JAN. 29, 1907.
G. T. WARWICK.
SCREW MACHINE.
APPLICATION FILED JULY 16, 1901.
9 SHEETS—SHEET 8.
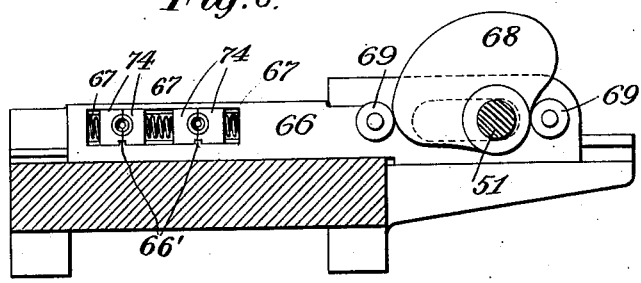
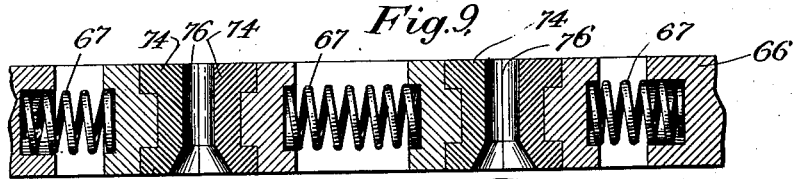
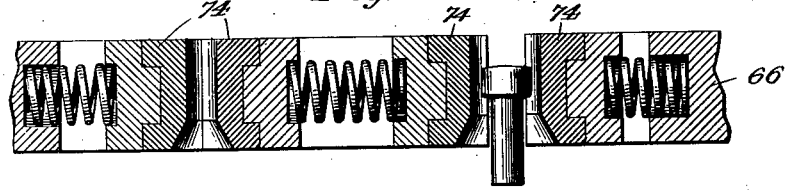
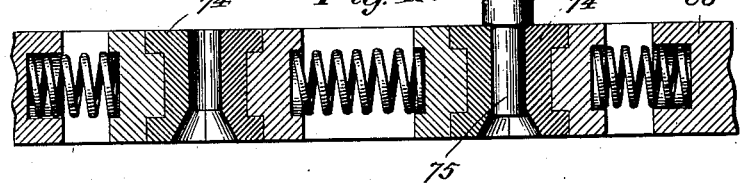
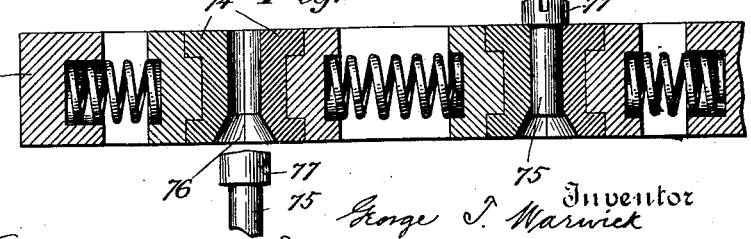

No. 842,282.
PATENTED JAN. 29, 1907.
G. T. WARWICK.
SCREW MACHINE.
APPLICATION FILED JULY 16, 1901.
9 SHEETS—SHEET 9.
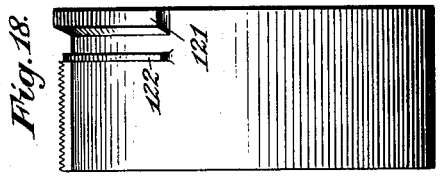
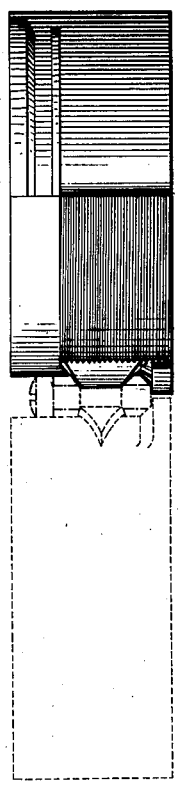
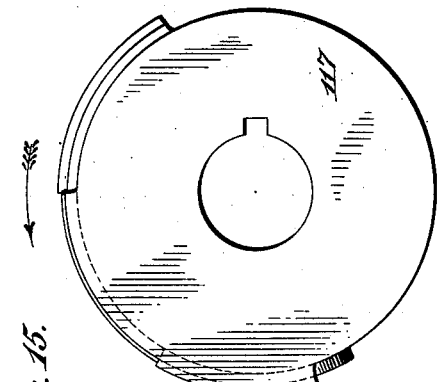
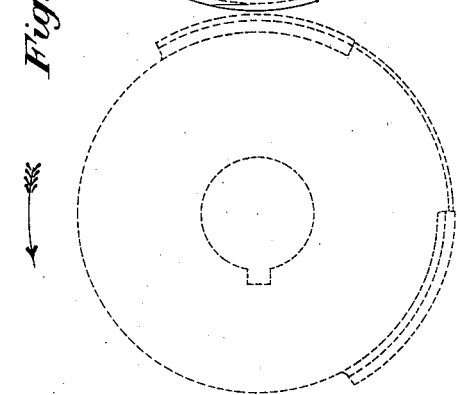
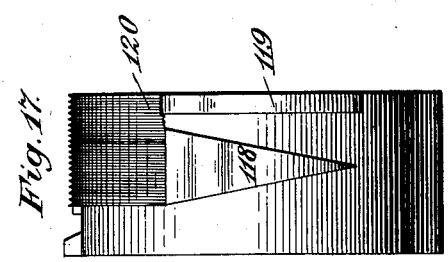
Witnesses
Chas. P. Schmelz
M. A. Campbell
Inventor
George T. Warwick
By his Attorney
Wm. S. Bellows

UNITED STATES PATENT OFFICE.

GEORGE T. WARWICK, OF SPRINGFIELD, MASSACHUSETTS.

SCREW-MACHINE.

No. 842,282.   Specification of Letters Patent.   Patented Jan. 29, 1907.

Application filed July 16, 1901. Serial No. 68,557.

*To all whom it may concern:*

Be it known that I, GEORGE T. WARWICK, a subject of the King of Great Britain, and a resident of Springfield, in the county of Hampden and State of Massachusetts, have invented certain new and useful Improvements in Screw-Machines, of which the following is a full, clear, and exact description.

This invention relates to metal-working machines, and more especially to that class thereof which are employed in the manufacture of screws; and it has for one of its objects the provision of a mechanism whereby screw-blanks may be formed in a continuous strip subsequently to be divided in proper lengths and provided with screw-threads, which in the present instance are rolled thereon.

My invention has, furthermore, for its object the provision of means whereby a wire as it may be drawn from a suitable reel will be gradually reduced in diameter and at certain portions of its length to form the head portions of the individual blanks, and my invention therefore comprises a pair of coacting reducing-rollers having a series of successively effective working faces whereby the wire is reduced, as above mentioned, and whereby at the same time the blank-forming sections are rolled out into their proper lengths.

A further object of my invention may be found in the provision of a device whereby the wire, or rather the blank-strip, is cut into individual blanks, each of which comprises a head portion the diameter of which is equal to that of the wire in its original form.

My invention has, furthermore, for its object the provision of a plurality of dies for properly shaping the head of the blank and for providing the same with a screw-driver slot, said dies being successively operative and comprising in the present instance a pair of finishing dies alternating in their work upon the blanks.

My invention has, furthermore, for its object the combination with said dies of means for holding the blanks during the operation of the dies, these means consisting, substantially, of a movable member shiftable into position to coöperate with the dies alternately.

My invention has, furthermore, for its object the provision of means for rolling a screw-thread on the body portion of the blank and in combination therewith a device for transferring the blank from the dies to said thread-rolling means.

Further objects of my invention may be found in the particular construction and organization of the several parts, as will be hereinafter described, and pointed out in the claims.

Figure 2A:
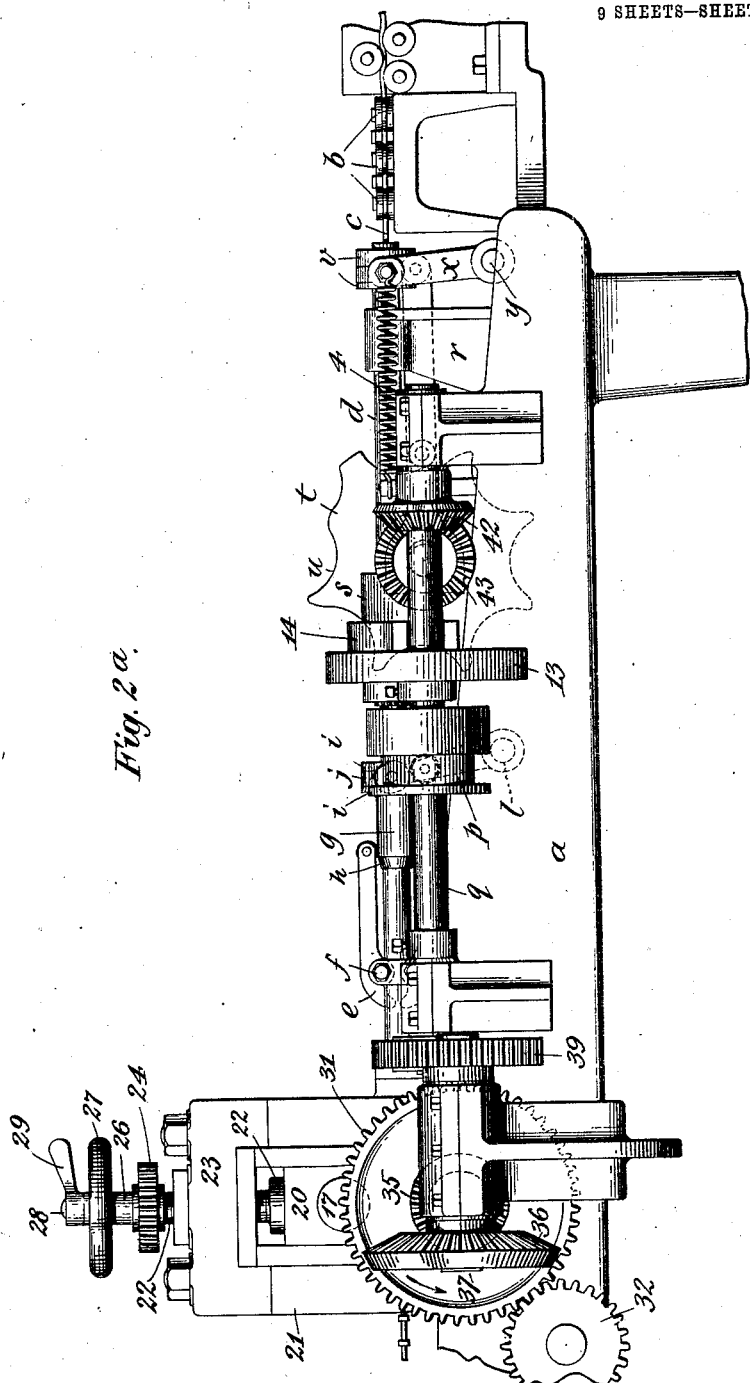

In the drawings accompanying this specification and in which similar characters denote similar parts, Figure 1ª in combination with Fig. 1ᵇ show a top view of a machine built in accordance with my invention. Figs. 2ª and 2ᵇ illustrate a side view thereof. Figs. 3ª and 3ᵇ represent a central longitudinal section of my improved machine. Fig. 4 is a face view of one of the pair of reducing-rollers. Fig. 5 shows a section thereof, taken on line A B of Fig. 4. Fig. 6 is a vertical cross-section of the machine, taken on line C D of Fig. 1ᵇ. Fig. 7 is a similar section taken on line E F of Fig. 1ᵇ. Fig. 8 is a section of the machine, showing the blank-holder slide and its operating mechanism. Figs. 9 to 14, inclusive, illustrate the operation of the heading-dies and also the manner in which the severed blank is positioned in the holder-slide. Figs. 15 to 18, inclusive, are detail views of the thread-rolling device, Fig. 15 being a face view of one of the rollers, Fig. 16 a top view thereof. Fig. 17 is an edge view looking from the left of Fig. 15, and Fig. 18 is a similar view looking from the right of Fig. 15, and Fig. 19 is a detail of one of the transferring devices whereby the headed blank is brought into contact with the thread-rolling mechanism.

In the drawings, $a$ denotes a suitable frame upon which the various component parts are supported.

Referring first to Fig. 1ª, it will be seen that on the right of said figure the frame $a$ carries a series of wire-straightening rolls $b$, which may be driven in any suitable manner, and whence the wire $c$ is conducted to the feeding means, comprising in the present instance a tubular member $d$, in which the wire is supported and gripped—as, for instance, by a pair of coacting jaws $e$, pivotally held, as at $f$, on the tube $d$. The jaws $e$ may be operated to grip the wire by means of a sleeve $g$, the forward end of which is beveled, as at $h$, while its opposite end is provided with a pair of flanges $i$, adapted to receive between them a collar $j$, said collar being engaged at diametrically opposite ends by a bifurcated lever $k$. This lever is secured near the end of a shaft $l$, journaled in a bracket $m$, and carrying at its other end an arm $n$, having a roller o in engagement with a cam-groove p, which is mounted on a shaft q, disposed at the side of the machine. The tubular feed-slide d is actuated so as to have a longitudinally-reciprocatory movement in brackets r s—as, for instance, by a cam t—between the projections of which are indentations u, which permit the slide d to move for a predetermined distance from right to left, the slide being provided near its right end with flanges v, between which is interposed a collar w, engaged by a bifurcated lever x, mounted upon a shaft y, which is journaled in bearings z. The lever x is operated by means of a link 1, pivoted to said lever x, as at 2, and carries a roller 3 in engagement with the cam t, above referred to, while a spring, such as 4, may be employed for normally moving the slide d from right to left, and thus keep the roller 3 in engagement with the cam t.

As the cam t rotates the lever x will have imparted to it a vibratory movement, in this manner subjecting the wire c repeatedly to the action of a series of successively-effective working faces of a wire-reducing mechanism, comprising in the present instance a pair of rolls 5 and 6, which are substantially alike and the construction of which is more particularly shown in Figs. 4 and 5 of the drawings. In order more clearly to understand the following description, it should be stated that the object of this wire-reducing mechanism is more especially to reduce only certain portions of the wire to form the body portion of a screw-blank, while the outside diameter of the wire will be retained to form the head portion of such blanks, which in this manner are formed in the shape of a continuous strip of wire, substantially as shown at the left of Fig. 3$^a$.

The working faces of the wire-reducing roll 5 are indicated herein by the numerals 7, 8, 9, 10, 11, and 12, as shown in Fig. 5, where it will be seen that the distance from the center of the roll to the several working faces is gradually increased, while at the same time the lengths of said working faces are also progressively increased. It will now be understood that when the working face 7 engages the wire c said wire will be slightly reduced in cross-section and that the portion of the wire outside of the engaging surface 7 will remain in its original size. As soon as the working face 7 has performed its function the wire c is retracted by a rearward movement of the slide d, so that when the roll 5 is rotated to bring the working face 8 into engagement with the wire said face 8 will reduce the cross-section of the wire at the same place longitudinally thereof which had been previously acted upon by the working face 7. This same operation is repeated until all of the working faces of the roller 5 have acted upon the wire, whereupon the slide d may be moved from right to left sufficiently to subject another length of wire to the action of the reducing-rolls, or, in other words, for a full feeding-distance. As soon as the last working face 12 of the roller 5 is in engagement with the wire and the latter is therefore firmly held and controlled the jaws e are released from the wire, so that the slide may be retracted, while said wire is left in engagement with the reducing-roller, and the next forward movement of the slide d will therefore present a new length of wire to the action of the reducing mechanism.

Inasmuch as it is evident that the coaction of the reducing-rollers 5 and 6 on the same length of wire will naturally tend to lengthen that portion of the wire, and inasmuch as it is essential that the reduction of the wire should be uniform throughout the length of the blank to be formed, the lengths of the individual working faces from 7 to 12, inclusive, are gradually increased proportionately to the reduction of the wire. It will also be understood that this continued action of the separate working faces on the wire would be liable to produce fins at that point where the two reducing-rollers come into contact with the wire and with each other. For this reason means are provided whereby the wire is turned axially after each engagement with any one of the working faces, so that if a fin should have been formed by one pair of faces the wire will be turned sufficiently to cause the next set of working faces to roll down said fin back into the body portion of the wire. These means consist in the present instance of a cam 13, actuating a bar 14, which is bifurcated at both ends and one end of which is provided with rack-teeth 15 (see Fig. 3$^a$) in engagement with gear-teeth 16, provided on the periphery of the slide d. In this manner said slide may be partially rotated to turn the wire in the manner above described and during the time when said slide is retracted with the wire by the lever x, above referred to.

The reducing-rollers 5 and 6 are herein shown mounted on spindles 17 and 18, respectively, the latter of which is journaled in stationary boxes 19, while the spindle 17 is mounted in bearings 20, mounted for vertical movement in a suitable framework 21, so as to allow for proper adjustment thereof. The spindle 17 may be vertically adjusted, as is, for instance, shown in Fig. 3$^a$, in which each of the boxes 20 is in engagement with a spindle 22, the outer end of which projects through the cap 23 of the frame 21 and is in screw-threaded engagement therewith. Near the upper end said screw 22 is provided with a gear 24 in constant engagement with teeth 25, formed in a sleeve 26, which constitutes the hub of a hand-wheel 27, and whereby said gear 24 may be turned, and thus raise or lower the boxes 20, as will be readily understood. The sleeve 26 is mounted for rotation on a preferably stationary stud 28, the upper end of which is screw-threaded to receive a hand-nut 29, whereby the sleeve 26 may be tightened against the cap 23, and thus prevented from displacement.

The spindles 17 and 18 may be caused to rotate together by suitable gears 30, secured thereto, while the spindle 18 carries also a gear 31 in engagement with an intermediate 32, which is driven from a gear 33, mounted upon the shaft 34, as seen in Fig. 2$^b$. Also mounted on the spindle 18 is a bevel-gear 35 in engagement with another bevel-gear 36, secured to a shaft 37, which is journaled in a bearing 38 and the other end of which carries a gear 39 in engagement with a pinion 40, secured upon the shaft $q$, above referred to. From this shaft rotary movement is imparted to the cross-shaft 41, which supports the cam $t$ above mentioned—as, for instance, by a pair of miter-gears 42 and 43, secured to the shafts $q$ and 41, respectively.

The mechanism thus far described forms what I preferably term the "blank-strip"—viz., a continuous strand of wire composed of reduced portions interrupted by sections which are of a diameter corresponding to the original size of the wire and constituting the heads of the blanks. I will now describe the several parts and mechanisms whereby said strip is divided into separate blanks which are subsequently finished and threaded to form the completed screw.

Referring especially to Figs. 1$^b$, 2$^b$, 3$^b$, the driving mechanism comprises a pulley 44, mounted upon a shaft 45 and carrying a pinion 46 in engagement with a gear 47, which is secured upon a shaft 48, constituting the main driving-shaft of the machine. Secured on the other end of the shaft 48 is a beveled gear 49, meshing into another beveled gear 50 on a shaft 51, which is journaled in bearings 52, secured to or forming a part of the framework $a$. At the right-hand end of the shaft 51 is a beveled gear 53, in engagement with another beveled gear 54, which is secured upon the shaft 34, above mentioned, and from which proper movement is imparted to the blank-strip-forming mechanism previously described. Secured upon the shaft 34 is a cam 55, acting on a cam-roller 56, which is journaled near one end of a lever 57, having its fulcrum at 58 intermediate its ends, and on a standard 59, which also serves as a medium for supporting a device for cutting off a blank from the strip. The lever 57 is slotted, as at 60, to engage a stud 61, held in a slide 62, which is guided in the standard 59, and the lower end of which may be provided with a suitable cutter or knife 63, whereby not only a blank may be severed from the strip, but whereby, furthermore, such blank may be positioned relatively to a holder for retaining the blank during the operation of finishing the head portion thereof. After the blank has been severed from the strip it will be forced downward by the cutter 63 until it rests upon a block 64, provided with a recess 65 for receiving the head of the blank. Disposed in front of the block 64 is a slide 66, which in the present instance contains a plurality of blank-holders, each of which comprises a pair of sections which are normally closed—as, for instance, by springs 67. (See Fig. 8). Reciprocatory movement may be imparted to the slide 66 by a cam 68, mounted upon the shaft 51 and engaging at opposite sides thereof a pair of cam-rollers 69, so that the movement of the slide is at all times under perfect control of the cam 68.

Means are provided for seating consecutive blanks in the holder, these means consisting substantially of a slide 70, having a plunger 71 and operated by a cam 72, in engagement with a cam-roller 73, journaled on the slide 70.

The operation of seating a blank in one of the holders 74 is clearly shown in Figs. 9 to 11, inclusive, and it will be seen by a comparison of Figs. 9 and 10 that when the blank 75 is pushed into the recess 76, formed between the holder-sections 74, the latter will be spread apart and against the action of the springs 67 and will immediately reclose as soon as the head 77 of the blank will have passed beyond the holder-sections 74 and substantially into position shown in Fig. 11.

Inasmuch as it is essential that the blank should be positioned properly within the slide 66, I provide thereon projections 66', which serve as means against which each pair of coöperating holder-sections 74 may abut and be centered thereby, as will be readily understood.

Coöperative with the holder 74 are means for shaping the projecting head of the blank, the mechanism shown in the drawings comprising a plurality of successively-effective dies, which are mounted for movement relatively to the blank-holder.

As soon as the blank has been properly placed within the holder 74 a die 78 is moved toward said holder, so as to indent the head of the blank substantially as shown in Fig. 12, and thus practically form what is ordinarily called the "screw-driver slot" of the blank. The die 78 is mounted upon a slide 79, which is mounted for vertical movement in a reciprocatory slide 80, the latter being operated by a cam 81, engaging a roller 82, which is journaled on the slide 80.

As above stated, I employ in the present instance a plurality of successively-effective dies for shaping the head of the blank, and for the sake of convenience I deem it preferable to retain the blank stationary within the holder 74 until the head has been substantially finished, this work being accomplished by a pair of consecutively-effective dies, one of which is the die 78, above referred to, while the second blow will be struck by a die 83, also held on the vertically-movable slide 79, above mentioned. For this reason the slide 79 will be shifted after the first blow has been delivered by the movement of the slide 80 and so as to bring the die 83 into alinement with the holder 74 preparatory to another movement of the slide 80 to strike the second blow, the effect of which can be seen in Fig. 13. From the foregoing it will be understood that the slide 80 moves once to strike the first blow, whereupon the vertically-movable slide 79 will be shifted to bring the die 83 into position so that the slide 80 may now again move forward, and thus strike the second blow with the die 83.

The vertical movement of the slide 79 is effected by a cam 84 engaging a cam-roller 85 on a thrust-rod 86, one end of which is pivotally attached to an arm 87, secured to a shaft 88, which is journaled in the frame, and the other end of which carries an arm 89, which may be connected to the slide 79—as, for instance, by a link 90.

After the first two blows have been struck to shape the head of the blank into a condition shown in Fig. 13 the slide 66 may now be shifted transversely of the bed, so as to bring the blank into alinement with one of the finishing-dies 91, (see Fig. 6,) disposed at opposite sides of the preparatory die and of such shape as to finish the head of the blank, as shown in Fig. 14.

The distance between the holders 74 in the slide 66 is such that when one of the holders is in position to receive a blank the other holder of the slide will be in alinement with one of the finishing-dies, so that a new blank may be seated in the holder, while at the same time the finishing-die strikes a blow on the blank in the companion holder, this action taking place at either side of the machine.

The finishing-dies 91 are in the present instance operated to move simultaneously, both being mounted on a slide 92, guided in ways 93 at opposite sides of the bed or frame and having proper movement imparted to it—as, for instance, by cranks 94, formed on the shaft 48—while the slide 92 itself serves as a medium of support for the slide 80 of the preparatory dies and which is held in contact with the operating-cam thereof—as, for instance, by springs 95 engaging a cross-bar 96, connected with the slide 80 in any suitable manner.

After the blank has been headed and finished into the condition shown in Fig. 14 the blank is removed from the holder and delivered to a mechanism whereby said blank is transferred from the holder to the device whereby a screw-thread is rolled on the body portion of the blank. The mechanism whereby the blank is removed from the holder and delivered to the transferring mechanism consists, substantially, of a slide 97, duplicated on the other side of the machine and having a roller 98 in engagement with the cam 99, which is mounted upon the shaft 34 above mentioned. The forward part of the slide 97 carries a plunger 100, the forward end of which is adapted to enter the rear side of the holder 74 in alinement therewith, and thus force the blank forward into position to be gripped by the transferring mechanism. This transferring mechanism is also made in duplicate, so that one mechanism is coöperative with each one of the finishing-dies, and it comprises in the preferred form thereof shown a pair of fingers disposed to engage the blank at diametrically opposite points and substantially in the manner shown in Fig. 6. Mounted on the shaft 51 is a cam 101, having a groove 102 for engaging a roller 103, which is journaled on the rod 104. This rod is bifurcated at its lower end to straddle the shaft 51, while at its upper end it is connected with a lever 105, pivoted intermediate its ends, as at 106, and the other end of which may be connected by a link 107 with one of a pair of vertically-movable slides 108 and 109, the latter of which carries a finger 110. The other slide 108 is provided with a finger 111, adapted to grip the blank at its upper side, while the finger 110 engages the same at its lower side, the thickness of the fingers 110 111 being slightly less than the diameter of the bottom diameter of the thread to be rolled. Both slides 108 109 are frictionally held in a suitable framework 112 and are mounted in such a manner as to move oppositely to each other and to bring the fingers into engagement with the blank as soon as the slide 109 commences to rise, this action being caused through the intervention of a pinion 113, pivoted on a stud 114, which is carried on a slide 115, mounted for vertical movement within the standard 112 and is frictioned therein sufficiently to counterbalance its own weight and also the tendency of movement caused by shifting the slides 108 and 109. The particular construction of the device is more clearly illustrated in Fig. 19, which represents a longitudinal section of one of the transferring devices corresponding substantially to the one shown at the right of Fig. 6. It will here be seen that the slide 109 has been moved upward until the finger 110 has engaged the blank at its under side, while at the same time the slide 108 was moved during the initial upward movement of the slide 109 to engage the blank at its upper side. During the movement thus far described the pinion-slide 115 was frictionally held stationary; but upon a continued upper movement of the slide 109 to the position shown in Fig. 19 the companion slides 108 and 109 and also the pinion-slide 115 were all moved upward together, both slides 108 and 109 being free to move within the slide 115 at the commencement of their movement. It will now be understood that if the slide 109 should be moved downward through the action of the cam 101 the slide 115 will, as a matter of course, be stationary, and thereby be effective through the pinion 113 to propel the slide 108 upward, in this manner separating the fingers 110 and 111 until the pivot-pin 116 will come into contact with the top of the slide 115, and thus move all of the three slides downward together bodily until they are into position corresponding to that shown to the left of Fig. 6.

As before stated, the transferring device will carry the headed blank into engagement with the mechanism for rolling a thread thereon. The thread-rolling device comprises in the present instance a pair of rollers, the construction of which is clearly shown in Figs. 15 to 18, inclusive, and it consists, substantially, of a roll having on the periphery a series of coöperative sections whereby the blank is manipulated and controlled. The roller is herein designated by the numeral 117 and is provided with a blank-reducing section 118, substantially wedge shape and adapted to reduce the body of the blank to the required size, while at the same time a partial peripheral flange 119 will impart the proper form to the end of the blank. The thread is, as has above been stated, rolled into the body of the blank, this function being performed by the threading-sections 120, while any longitudinal movement or displacement of the blank will be prevented by a pair of coacting guard-flanges 121 and 122, respectively. The threading-rollers are in the present instance continually rotating and are mounted upon spindles 123 and 124, respectively, each of which is journaled in the standard 112 and carries at its other end a gear 125 in engagement with an intermediate 126, journaled on a stud in the frame 112. It will now be seen that when the intermediate 126 is rotated both companion rollers 117 will rotate in the same direction. In the present case the threading device is duplicated on the other side of the machine, so as to have one set of threading-rollers coöperate with each finishing-die and the transferring mechanism connected therewith, the operation of the latter being effective also from the cam 101 above referred to and which also operates a lever 127, the function of which is similar to the lever 105 above mentioned.

Means are provided for operating both sets of threading-rollers simultaneously, these means comprising a pair of sprocket-wheels 128, secured to the intermediates 126 and driven by a chain 129 from a sprocket-wheel 130, secured upon a shaft 51 above mentioned.

The operation of my improved machine is as follows: A plain wire having a diameter corresponding to that of the head of the screw to be made is introduced into the machine, near the right-hand end thereof, passed through the tubular slide $d$, between the clamping-jaws $e$, and into contact with the wire-reducing rollers 5 and 6. The working faces 7 will now become effective to reduce and correspondingly elongate the cross-section of the wire to a slight extent, and as soon as the working faces 7 have finished their work and a shoulder formed on the wire by the faces 7 is free to pass by the roller 5 and back into its first position the same length of wire which had been previously acted upon by the face 7 will now again be worked by the next face 8, after which the slide, with the wire, will be again retracted and the face 9 will become effective in reducing and correspondingly elongating the wire still more. This operation is repeated until all of the working faces of the roll 5 have performed their reducing operations, when the slide $d$ will present a new length of wire to the action of the reducing mechanism. The blank-strip, which now resembles somewhat that shown at the left of Fig. 3ª, will then be brought under the knife 63, which will sever a blank from the strip and position the same in front of one of the holders 74, whereupon the slide 70 with its plunger 71 will seat the blank in the holder, substantially in the manner illustrated in Figs. 9, 10, 11. The die 78 will now strike the first blow, and thus produce the result shown in Fig. 12, whereupon the vertically-movable slide 79 may be moved downward, and thus give the die 83 an opportunity of striking the second blow, which shapes the head of the blank substantially as shown in Fig. 13. The cross-slide 66 is now shifted laterally of the bed and brings the blank into position opposite or in alinement with the finishing-die at the right-hand side of the machine, where the head is given its final and finished shape. The ejector-slide 97 will now advance and force the blank out of the holder 74 and into position to be gripped by the fingers 110 and 111 of the transfer mechanism, which will shift the blank and hold it between the threading-rollers during their operation thereon. The threading-rollers will at first engage the blank with their reducing-sections 118 and then roll a thread on the blank by the threading-sections 120, after which the transferring mechanism will be started downward, and thus release the blank, which has now been threaded and is in the form of a finished screw having a round head with a screwdriver slot. Immediately after the transfer of the blank into alinement with the finishing-die at the right-hand side of the machine the other holder of the slide 66 will have been brought into alinement with the plunger-slide 70 and will therefore be ready to receive a blank, which may then be operated upon by the heading-dies in the same manner as the first blank, so that after the first blank has been discharged from the cross-slide and the second blank has been acted upon by the primary dies said slide will be shifted from right to left, and thus bring the second blank into alinement with the finishing-die on the left side of the machine, to be finished thereby, and consequently to be delivered by the other injector-slide to the transfer mechanism on that side of the machine. The blank will now be brought into contact with the duplicate set of threading-rollers, the operation of which is similar to that of the threading-rollers above described.

Having thus described my invention, what I claim, and desire to secure by Letters Patent, is—

1. The combination, with the blank-holder, of a head-shaping die, a pair of finishing-dies disposed at opposite sides thereof, and means for shifting the blank-holder alternately into alinement with the head-shaping dies and the finishing-dies.

2. The combination, with the head-shaping die and a pair of finishing-dies, of a blank-holder slide, and means for actuating said slide to bring the blank-holder alternately into alinement with said dies, respectively.

3. The combination, with means for feeding a blank-strip, an intermittently-movable slide having a plurality of blank-holders, a device for cutting off successive blanks from the strip and bringing them into alinement with said holders, means for removing the blanks from the cutting device into said holders, successively, a die for shaping the head of the blank, and means for moving said die into coöperation with one of said holders, of a pair of finishing-dies coöperative with the blank-holders, a reciprocatory slide for supporting said finishing-dies, and independent means for actuating both, the blank-holder slide and the die-slide, to bring the blank-holders and dies successively into alinement, alternately.

4. The combination, with a slide comprising a blank-holder, and a primary slide movable toward and away from the holder, of a secondary slide movable on the primary slide right-angularly to its longitudinal movement, and having thereon a slot-forming die, and also a head-contracting die, means for moving the primary slide toward and away from the blank-holder; means for imparting, successively, movement to the secondary slide, whereby the dies thereon are presented in succession opposite the blank-holder for the respective operations thereon, a finishing-die located at a distance from the line of movement of the double die-carrying slide, means for moving the same toward and away from the blank-holder slide, and means for sliding the blank-holder slide, substantially as and for the purposes set forth.

5. The combination, with a blank-holder, comprising a plurality of movable sections and springs for normally contracting said sections, of means operable on one side of said holder for forcing a headed blank between and through the holder-sections, and means coöperative with the other side of said holder and for shaping the head of the severed blank.

6. The combination, with blank-feeding means, a blank-holder, comprising a pair of movable sections, and means for normally contracting said sections; of abutments for locating said sections normally in alinement with an advancing headed blank, means operable at one side of the holder for positioning the blank in alinement with the holder, a device for forcing a blank through and between the holder-sections, and means coöperative with the other side of the holder for shaping the head of the blank.

7. The combination, with feeding means, and a device for cutting off a blank, of a pair of rollers for rolling a thread on the blank, and a mechanism for removing the cut-off blank from the cutting device to the threading-rollers and for supporting the cut-off blank during the action of the threading-rollers on the blank.

8. The combination, with feeding means, a mechanism for reducing the blank-body, and a device for cutting off a blank, of a pair of threading-rollers having flanges for guiding the head of the blank during the thread-rolling operation, and a mechanism for removing the cut-off blank from the cutting device, and for positioning the blank between the threading-rollers.

9. The combination, with feeding means, a mechanism for forming a blank-strip, and a device for cutting off a blank, of a pair of threading-rollers having flanges for guiding the head of the blank during the thread-rolling operation, and having members for shaping the end of the threaded blank-body, and a mechanism for removing the cut-off blank from the cutting device, and for positioning the blank between the threading-rollers.

10. The combination, with a blank-holder, of a thread-rolling device, and a mechanism comprising a pair of oppositely-movable slides, and opposed blank-engaging fingers carried thereby, means for removing the blank from the holder into position to be received by the fingers and means for actuating said slides and fingers for receiving and transferring a headed blank from the holder to the thread-rolling device.

11. The combination, with a blank-holder, of a thread-rolling device, a mechanism comprising a pair of oppositely-movable slides, fingers carried thereby and for receiving and transferring a headed blank from the holder to the thread-rolling device, means for moving one of said slides by the movement of the other, and means for removing the blank from the holder into position to be received by said fingers.

12. The combination, with a blank-holder, of threading-rollers, a mechanism comprising a pair of oppositely-movable slides carrying fingers for transferring a headed blank from the holder to the threading-rollers, means for removing the blank from the holder into position to be received by the fingers, means for moving one of said slides by the movement of the other, and for causing said fingers to engage the blank, and means for shifting both of the slides, bodily, for bringing said fingers with the blank into position between the threading-rollers.

13. The combination, with a blank-holder, and means for removing the blank therefrom, of threading-rollers, a mechanism comprising a pair of oppositely-movable slides, carrying fingers for transferring a headed blank from the holder to the threading-rollers, means for moving one of said slides by the movement of the other, and for causing said fingers to engage the blank, means for shifting both slides, together, in one direction, to bring the blank into position between the threading-rollers, and means for shifting the primary slide in the other direction to release said fingers from the blank.

14. The combination, with a blank-holder, of a thread-rolling device, a mechanism for transferring the blank from the holder to the threading device, and comprising a pair of oppositely-movable finger-slides each of which is provided with rack-teeth, and a pinion in engagement therewith, and for causing said slides to move toward each other to engage the blank.

15. The combination, with a blank-holder, of a thread-rolling device, a mechanism for transferring the blank from the holder to the threading device, and comprising a pair of oppositely-movable finger-slides each of which is provided with rack-teeth, and a pinion in engagement therewith and having its axis mounted for movement in parallelism with the movement of said slides.

16. The combination, with a blank-holder, of a thread-rolling device, a pair of oppositely-movable finger-slides for transferring a blank from the holder to the threading device, a pinion in engagement with both of said slides and having its axis mounted for movement in parallelism with the slide movement, and means for frictionally retaining said axis in position and for causing said finger-slides to engage the blank.

17. The combination, with a blank-holder, of a thread-rolling device, a pair of oppositely-movable finger-slides, means for actuating one of said slides to cause both finger-slides to engage the blank at opposite sides thereof, and subsequently to move both slides in unison with the blank for transferring the same from the holder to the thread-rolling device.

Signed by me at Springfield, Massachusetts, this 22d day of June, 1901.

GEORGE T. WARWICK.

Witnesses:
   Wm. S. Bellows,
   M. A. Campbell.